United States Patent
Yang

[11] Patent Number: 5,829,340
[45] Date of Patent: Nov. 3, 1998

[54] COFFEE MAKER

[76] Inventor: Po-Han Yang, 56, Min Sheng Street, Fengyuan, Taichung, Taiwan

[21] Appl. No.: 839,696

[22] Filed: Apr. 15, 1997

[51] Int. Cl.[6] ...................................................... A47J 31/40
[52] U.S. Cl. .................................. 99/290; 99/293; 99/307
[58] Field of Search .............................. 99/293, 290, 307, 99/294, 279

[56] References Cited

U.S. PATENT DOCUMENTS

| | | | |
|---|---|---|---|
| 4,603,620 | 8/1986 | Daugherty | 99/290 X |
| 4,945,824 | 8/1990 | Borgmann | 99/293 |
| 5,724,883 | 3/1998 | Usherovich | 99/290 |

*Primary Examiner*—Reginald L. Alexander

[57] ABSTRACT

A coffee maker has a main body, a bottle connected to the main body which has a base seat, a hollow frame disposed on the base seat, a curved groove formed in the hollow frame, a steering device disposed in the hollow frame, and an upper cover device disposed on the main body. The upper cover device has a yoke, a first cap disposed on a first end of the yoke, a second cap disposed on a second end of the yoke, and a swivel button disposed on the yoke. The base seat has a first round plate and a second round plate. The steering device has a steam outlet disk disposed beneath the first cap, and a water outlet disk disposed beneath the second cap. A coffee container receives a filter device. The filter device receives a dish. The coffee container is disposed beneath the steam outlet disk. A cup is disposed beneath the second cap.

1 Claim, 6 Drawing Sheets

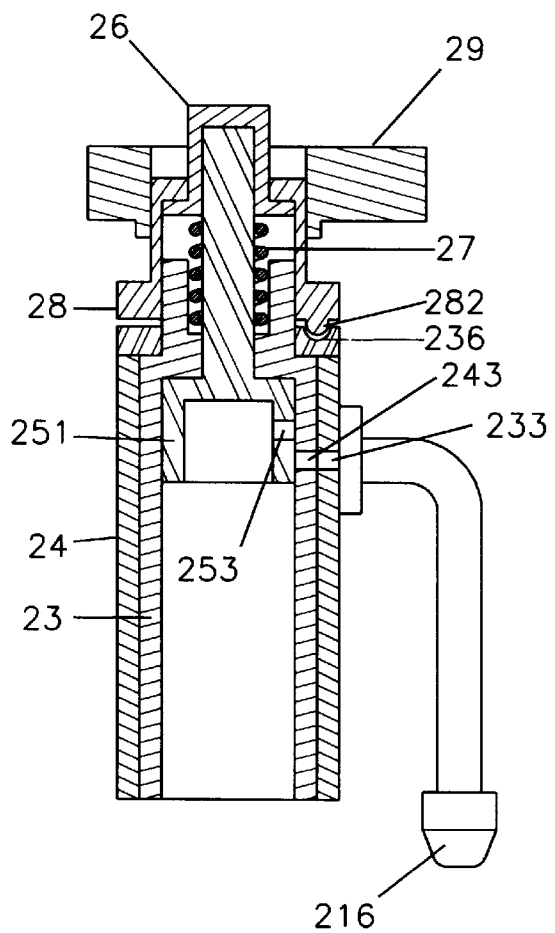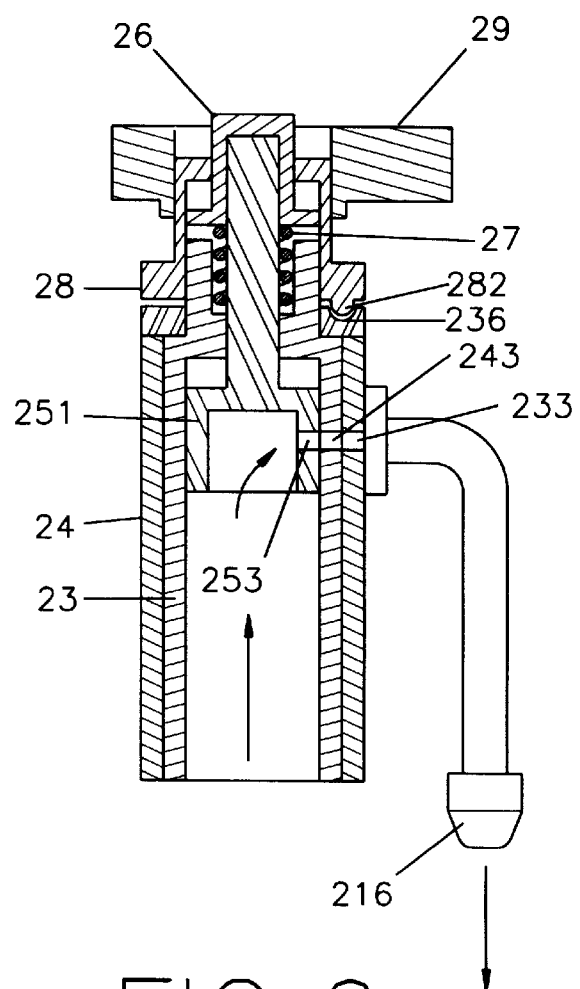

COFFEE MAKER

BACKGROUND OF THE INVENTION

The invention relates to a coffee maker. More particularly, the invention relates to a coffee maker which has a steering device without any screw rod.

A conventional coffee maker has a plurality of control valves. Each control valve has a screw rod to adjust an opening of a vent.

SUMMARY OF THE INVENTION

An object of the invention is to provide a coffee maker which has a steering device as a three-way control valve without any screw rod.

BRIEF DESCRIPTION OF THE DRAWINGS

FIG. 5 is a sectional view of a steering device;

FIG. 6 is another sectional view of a steering device; and

DETAILED DESCRIPTION OF THE INVENTION

Figure 1:
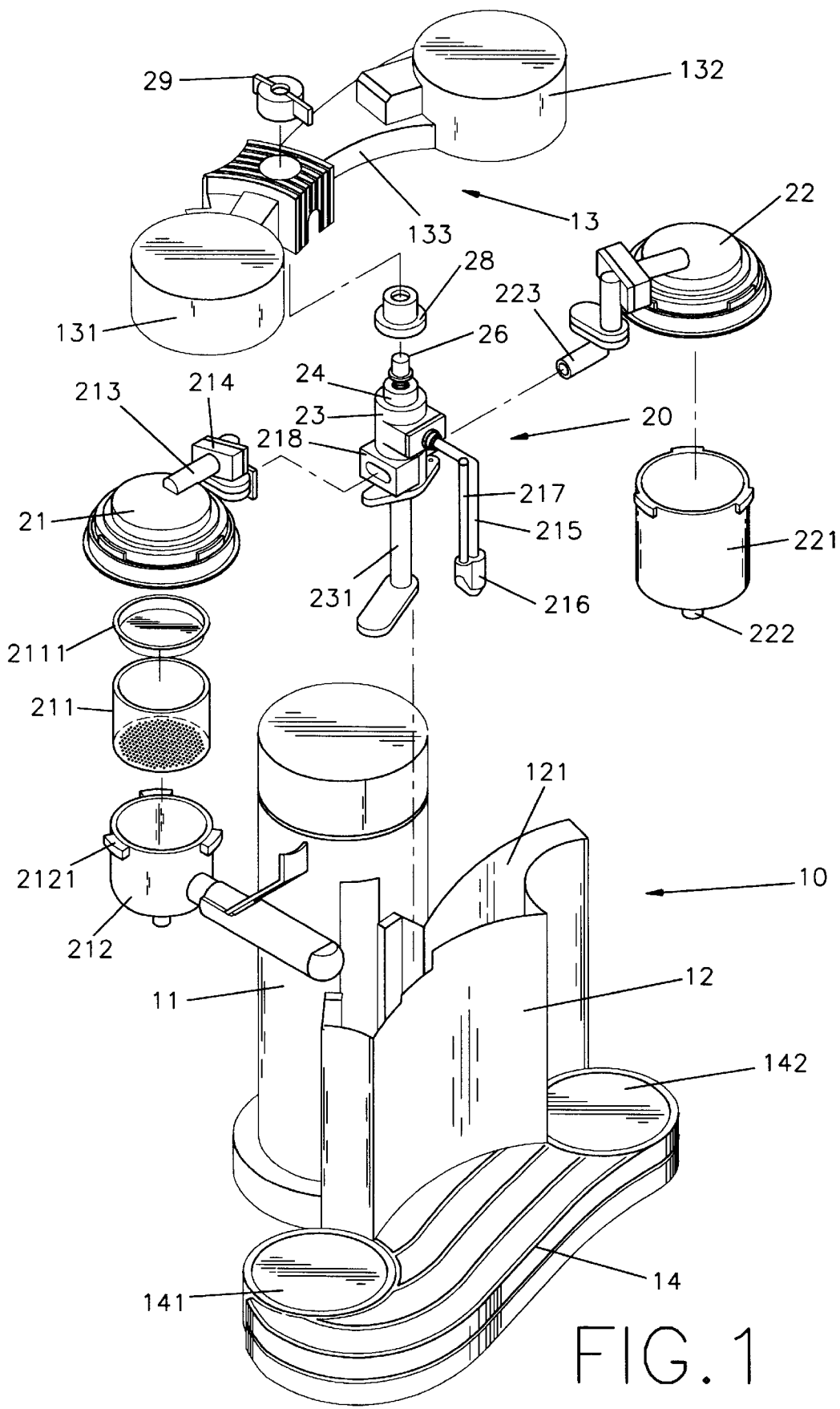
FIG. 1 is a perspective exploded view of a coffee maker of a preferred embodiment in accordance with the invention.
Figure 2:
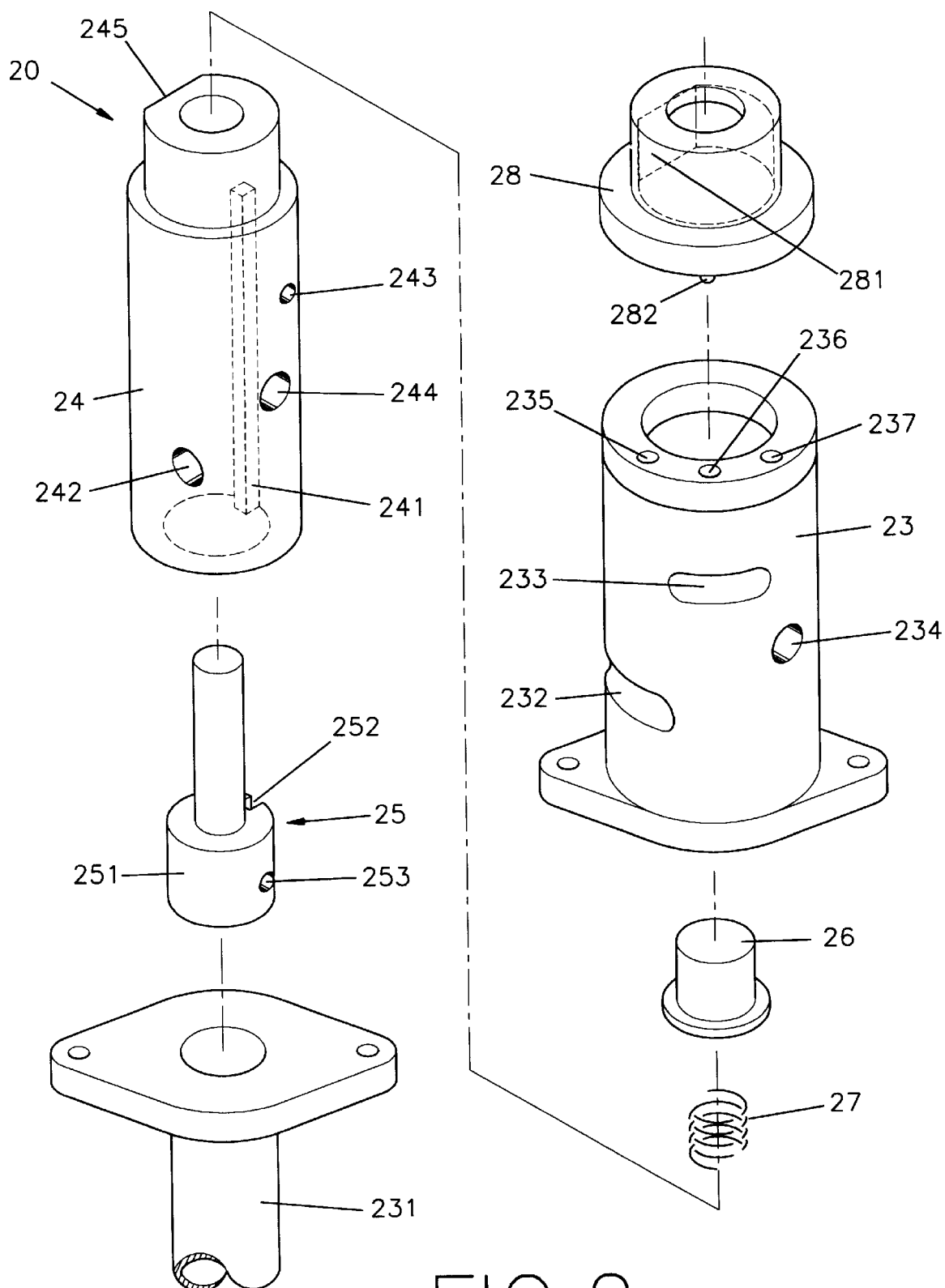
FIG. 2 is a perspective exploded view of a steering device.
Figure 3:
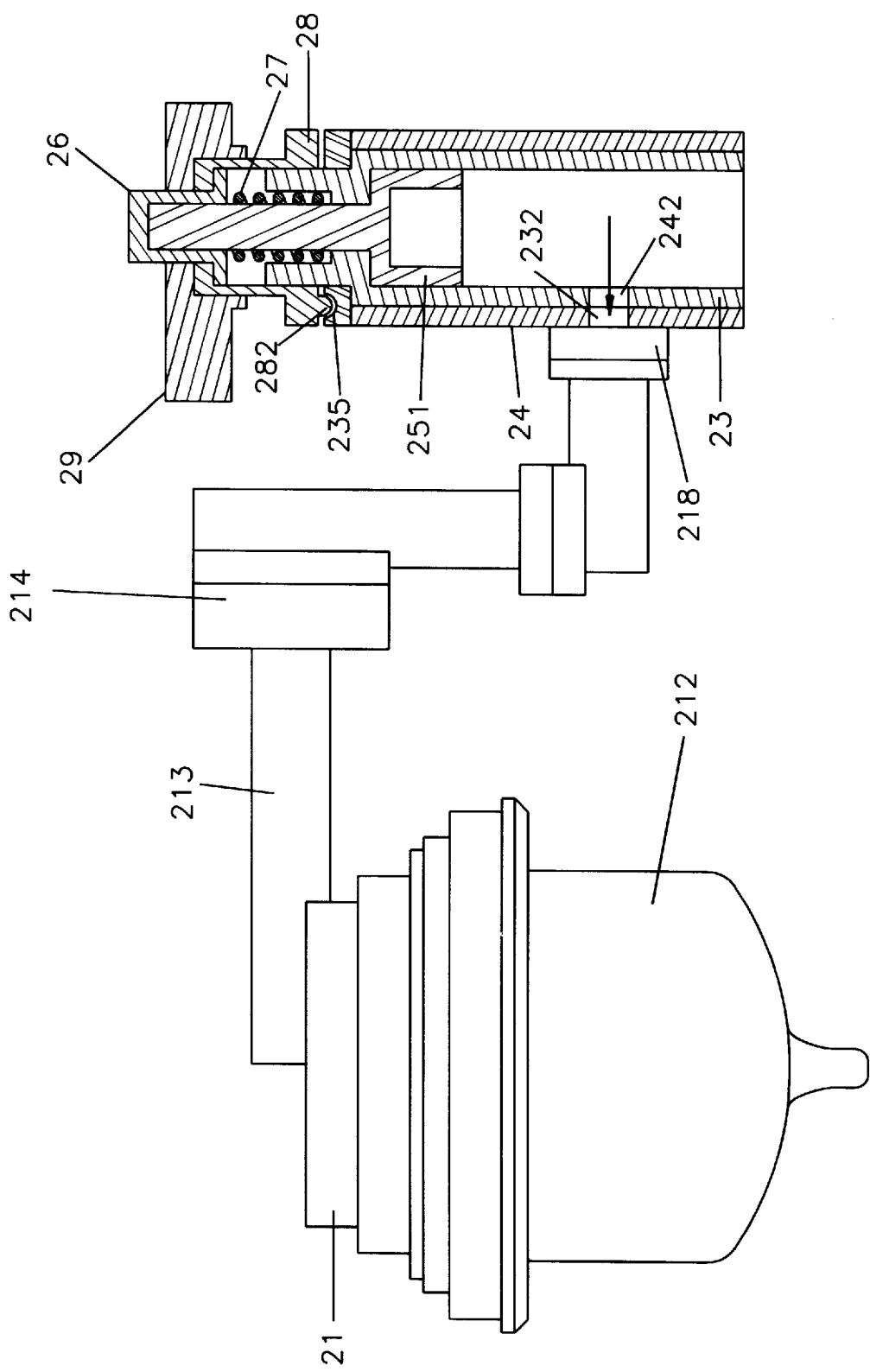
FIG. 3 is a partially sectional view of a steering device and a steam outlet disk.
Figure 4:
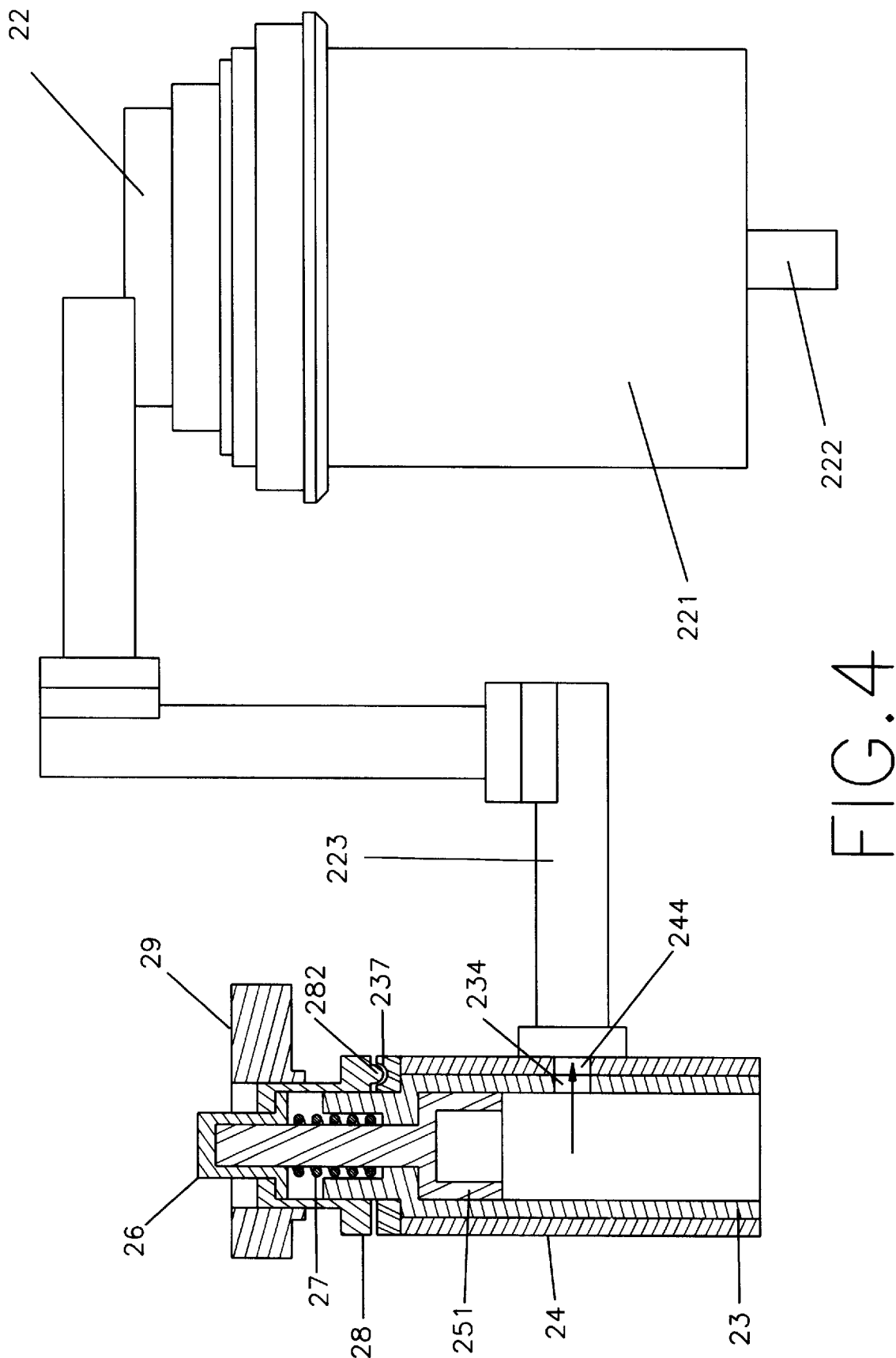
FIG. 4 is a partially sectional view of a steering device and a water outlet disk.
Figure 7:
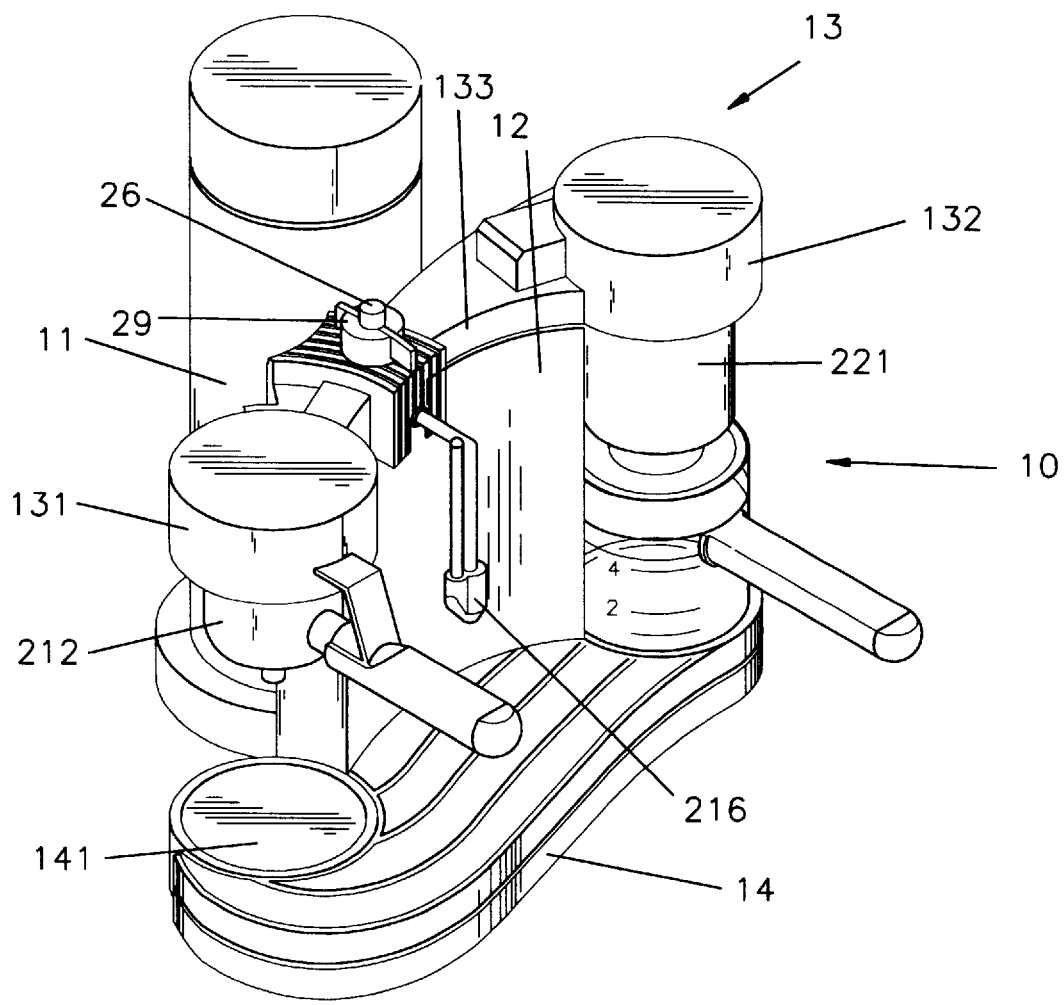
FIG. 7 is a perspective assembly view of a coffee maker of a preferred embodiment in accordance with the invention.

Referring to FIGS. 1 to 7, a coffee maker comprises a main body 10, a bottle 11 connected to the main body 10, the main body 10 having a base seat 14, a hollow frame 12 disposed on the base seat 14, a curved groove 121 formed in the hollow frame 12, a steering device 20 disposed in the hollow frame 12, the bottle 11 having a connecting tube (not shown in the figures) connected to the steering device 20, and an upper cover device 13 disposed on the main body 10. The upper cover device 13 has a yoke 133, a first cap 131 disposed on a first end of the yoke 133, a second cap 132 disposed on a second end of the yoke 133, and a swivel button 29 disposed on the yoke 133. The base seat 14 has a first round plate 141 and a second round plate 142. The steering device 20 comprises a steam outlet disk 21 disposed beneath the first cap 131, and a water outlet disk 22 disposed beneath the second cap 132. A coffee container 212 receives a filter device 211. The filter device 211 receives a dish 2111. The coffee container 212 is disposed beneath the steam outlet disk 21. A cup 221 is disposed beneath the second cap 132. The coffee container 212 has three lugs 2121. A connecting pipe 213 is disposed on the steam outlet disk 21 and connected to a block 214. A water outlet nozzle 222 is disposed on the cup 221. An outlet tube 223 is connected to the water outlet disk 22. The steering device 20 has an outer cylinder 23, an inner cylinder 24 inserted in the outer cylinder 23, a steering head 28 covering the outer cylinder 23, a plug 25 inserted in the inner cylinder 24, a spring 27 and a press seat 26 enclosing the plug 25, a guide pipe 231 connected to the outer cylinder 23, a mount 218 disposed on the guide pipe 231 and enclosing the outer cylinder 23, the mount 218 communicating with the block 214, a steam nozzle 216 connected to a guide tube 215, and a conduit 217 connected to the steam nozzle 216. The outer cylinder 23 has a first steam outlet 232 connected to the connecting pipe 213, a second steam outlet 233 connected to a guide tube 215, a third steam outlet 234 connected to the outlet tube 223, a first positioning hole 235, a second positioning hole 236, and a third positioning hole 237. The inner cylinder 24 has a camber head 245 inserted in an inner periphery 281 of the steering head 28, a first round hole 242 matching the first steam outlet 232, a second round hole 243 matching the second steam outlet 233, a third round hole 244 matching the third steam outlet 234 while the inner cylinder 24 is rotated, and a guide post 241 disposed in the inner cylinder 24. The plug 25 has a cylindrical head 251 which has a guide recess 252 receiving the guide post 241 and a communicating hole 253. The swivel button 29 engages with the steering head 28. A protrusion 282 is disposed on the steering head 28 to be inserted in one of the three positioning holes 235, 236 and 237. The connecting tube is connected to the guide pipe 231.

When the protrusion 282 is inserted in the first positioning hole 235, then the first round hole 242 communicates with the first steam outlet 232. A steam flows from the bottle 11 to a bottom of the outer cylinder 23, to the first round hole 242, to the first steam outlet 232, and to the steam outlet disk 21. The dish 211 is removed so that the steam can flow into the filter device 211 and the coffee container 212.

When the protrusion 282 is inserted in the second positioning hole 236, then the second round hole 243 communicates with the second steam outlet 233. The first round hole 242 communicates with the first steam outlet 232. The steam is blocked by the cylindrical head 251. The press seat 26 is pressed down so that the communicating hole 253 communicates with the second round hole 243 and the second steam outlet 233.

When the protrusion 282 is inserted in the third positioning hole 237, then the third round hole 244 communicates with the third steam outlet 234. The steam flows to the outlet tube 223, the cup 221 and the water outlet nozzle 222.

The invention is not limited to the above embodiment but various modification thereof may be made. Further, various changes in form and detail may be made without departing from the scope of the invention.

What is claimed is:

1. A coffee maker comprises:

a main body, and a bottle connected to the main body, the main body having a base seat, a hollow frame disposed on the base seat, a curved groove formed in the hollow frame, a steering device disposed in the hollow frame, the bottle having a connecting tube connected to the steering device, and an upper cover device disposed on the main body, the upper cover device having a yoke, a first cap disposed on a first end of the yoke, a second cap disposed on a second end of the yoke, and a swivel button disposed on the yoke, the base seat having a first round plate and a second round plate, the steering device comprising a steam outlet disk disposed beneath the first cap, and a water outlet disk disposed beneath the second cap, a coffee container receiving a filter device, the filter device receiving a dish, the coffee container disposed beneath the steam outlet disk, a cup disposed beneath the second cap, the coffee container having three lugs, a connecting pipe disposed on the steam outlet disk and connected to a block, a water outlet nozzle disposed on the cup, an outlet tube connected to the water outlet disk, the steering device having an outer cylinder, an inner cylinder inserted in the outer cylinder, a steering head covering the outer cylinder., a plug inserted in the inner cylinder, a spring and a press seat enclosing the plug, a guide pipe connected to the outer cylinder, a mount disposed on the guide pipe and enclosing the outer cylinder, the mount communicating with the block, a steam nozzle connected to a guide tube, and a conduit connected to the steam nozzle, the outer cylinder having a first steam outlet connected to the connecting pipe, a second steam outlet connected to a guide tube, a third steam outlet connected to the outlet tube, a first positioning hole, a second positioning hole, and a third positioning hole, the inner cylinder having a camber head inserted in an inner periphery of the steering head, a first round hole matching the first steam outlet, a second round hole matching the second steam outlet, a third round hole matching the third steam outlet while the inner cylinder is rotated, and a guide post disposed in the inner cylinder, the plug having a cylindrical head which has a guide recess receiving the guide post and a communicating hole, the swivel button engaging with the steering head, a protrusion disposed on the steering head to be inserted in one of the positioning holes, and the connecting pipe connected to the guide pipe, when the protrusion is inserted in the first positioning hole, then the first round hole communicates with the first steam outlet, a steam flows from the bottle to a bottom of the outer cylinder, to the first round hole, to the first steam outlet, and to the steam outlet disk, and the dish is removed so that the steam flows into the filter device and the coffee container, when the protrusion is inserted in the second positioning hole, then the second round hole communicates with the second steam outlet, then the first round hole communicates with the first steam outlet, the steam is blocked by the cylindrical head, and the press seat is pressed down so that the communicating hole communicates with the second round hole and the second steam outlet, when the protrusion is inserted in the third positioning hole, then the third round hole communicates with the third steam outlet, and a steam flows to the outlet tube, the cup and the water outlet nozzle.

\* \* \* \* \*